June 5, 1951
L. R. EDWARDS
2,555,437
FROG FEEDER
Filed April 10, 1950
2 Sheets-Sheet 1
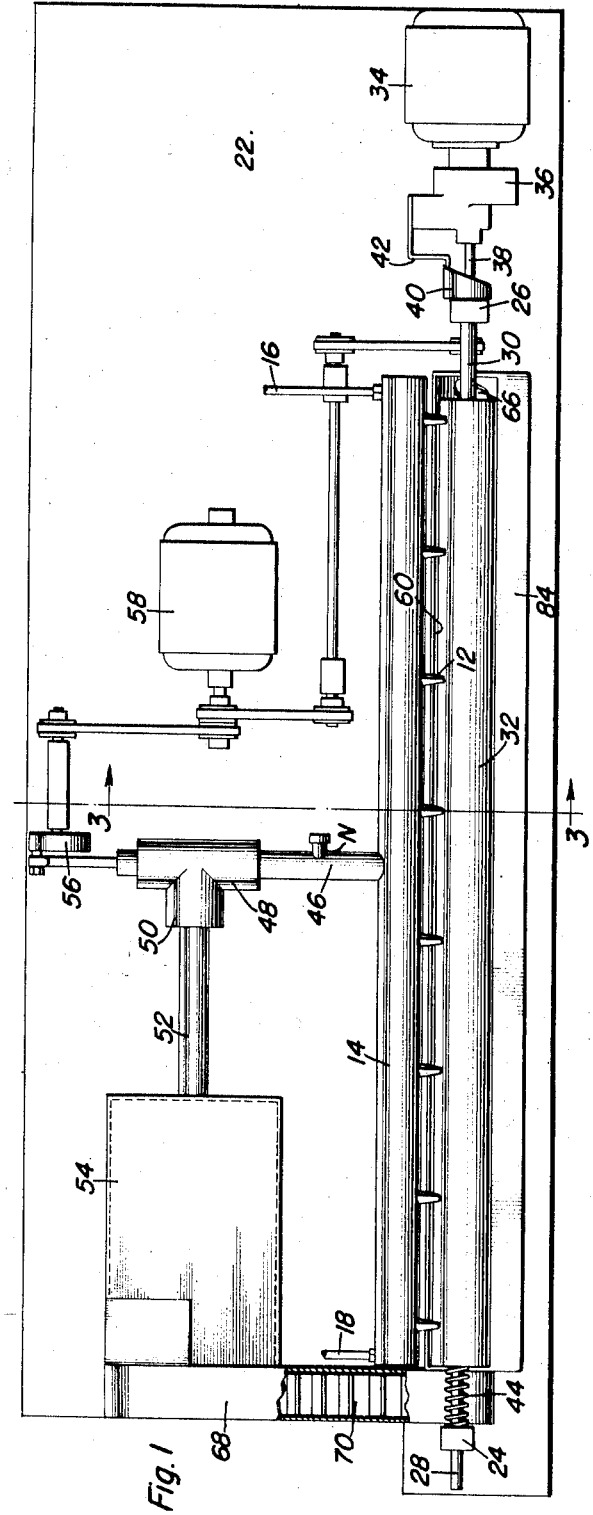
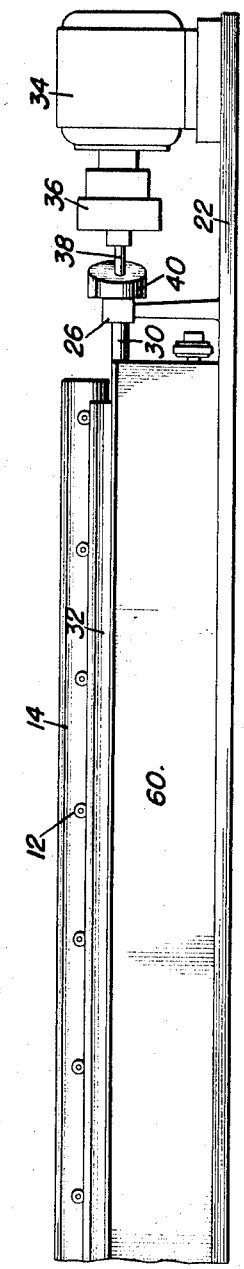
Leslie R. Edwards
INVENTOR.

June 5, 1951     L. R. EDWARDS     2,555,437
FROG FEEDER

Filed April 10, 1950     2 Sheets-Sheet 2

Leslie R. Edwards
INVENTOR.

Patented June 5, 1951

2,555,437

UNITED STATES PATENT OFFICE 2,555,437

FROG FEEDER

Leslie R. Edwards, Gurdon, Ark.

Application April 10, 1950, Serial No. 155,113

10 Claims. (Cl. 119—51)

This invention relates to new and useful improvements in feeding devices and more particularly to a device for feeding frogs.

The primary object of the present invention is to provide a hydraulically fed dispenser together with a rotating and reciprocating roller whereby feed passing from the dispenser and discharged upon the roller will be agitated and vibrated to attract frogs thereto and thereby permit the feeding of frogs with highly viscous feed and without the necessity of having to raise worms and the like for such feeding purposes.

Another important object of the present invention is to provide a frog feeder including a rotating and reciprocating roller with means for dispensing feed onto the roller so that the feed will lie upon the roller in a spiral path to simulate worms which are attractive to frogs.

A further object of the present invention is to provide a frog feeder that is continuous in operation and which requires very little service and cleaning.

A still further aim of the present invention is to provide a frog feeder that is simple and practical in construction, highly efficient and reliable in operation, small and compact in structure, inexpensive to manufacture, service and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the present invention with the casing removed therefrom;

Figure 2 is a fragmentary front elevational view of Figure 1; and,

Figure 3:
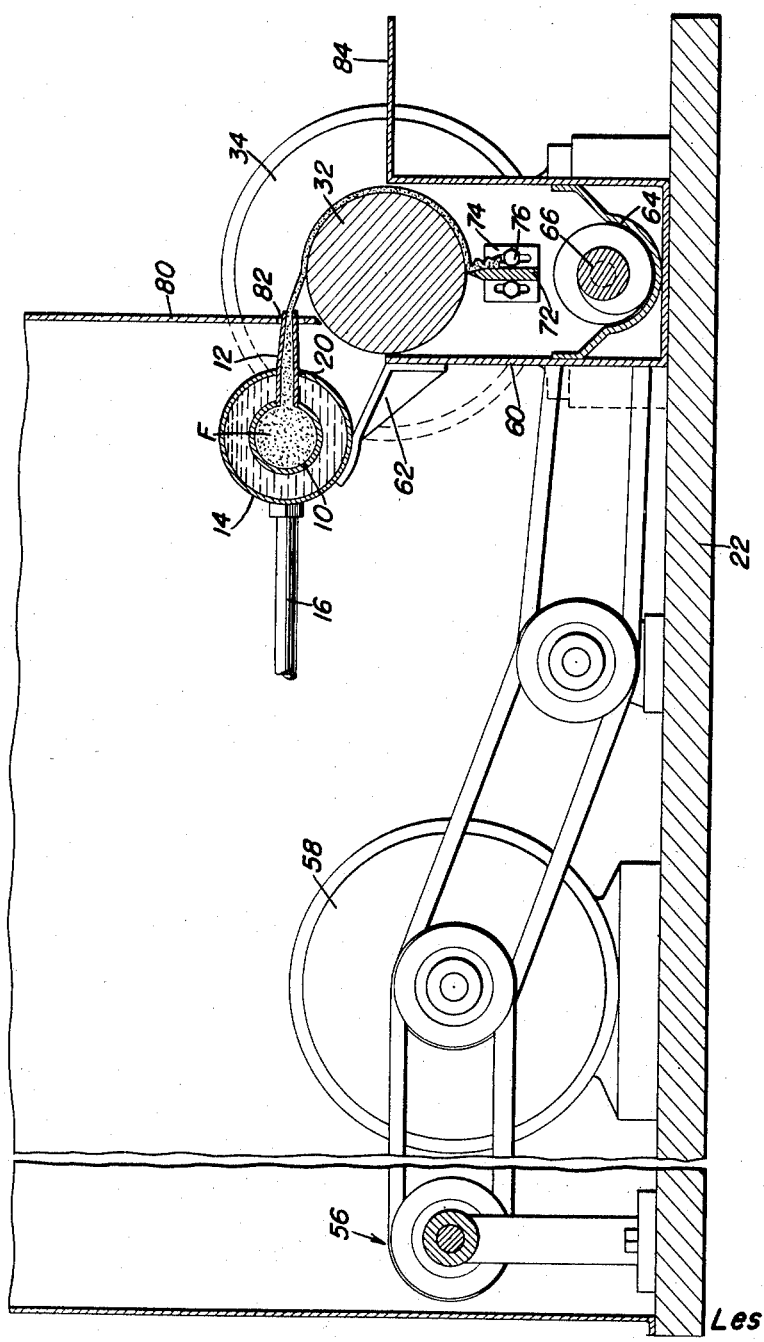
Figure 3 is an enlarged transverse vertical sectional view taken substantially on the plane of section line 3—3 of Figure 1.

Referring now to the drawings in detail, wherein for the purpose of illustration, there is disclosed a preferred embodiment of the present invention, the numeral 10 represents an elongated horizontally disposed conduit or cylindrical dispenser, closed at both ends, and having a plurality of longitudinally spaced horizontally and laterally projecting dispensing nipples or jets 12.

A cylindrical jacket 14 encases the conduit 10 and both ends of the jacket 14 are closed. A supply pipe 16 extending from a suitable source of cooling medium enters the jacket and a return pipe 18 leads from the jacket and back to the source of cooling medium to provide a closed fluid system for circulating a cooling medium about the conduit 10 and thereby prevent the feed in the conduit 10 from becoming warm and distasteful to frogs. The jacket 14 is provided with openings 20 through which the nipples 12 project. The nipples are suitably sealed in the openings 20 to prevent liquid from leaking from the jacket by way of the openings 20.

The conduit 10 and jacket 14 overlie a base 22 from which there rises a pair of bearings 24 and 26 that rotatably and slidably receive the reduced end portions 28 and 30 of a rotating and reciprocating roller 32 that underlies the nipples 12.

A motor 34 is mounted on the base 22 and includes a drive shaft that is connected through reduction gearing in a housing 36 to a driven shaft 38. The end portion 30 is hollow and internally splined to receive the externally splined end of the shaft 38 so that the roller 32 will rotate with the shaft 38.

A cam 40 is held on the end portion 30, by any suitable means, for rotation with the roller 32 and a finger 42 mounted on the housing 36 rides against the cam 40 to impart longitudinal movement to the roller 32 as the motor 34 indirectly rotates the roller.

A coil spring 44 surrounds the end portion 28 and is biased between the bearing 24 and one end of the roller 32 to yieldingly urge the cam 40 against the finger 42.

A supply tube 46 enters the conduit 10 intermediate the ends of the conduit 10 and includes a T-joint 48 having a branch arm 50 that is coupled to an outlet pipe 52. The pipe 52 is connected to the lower end of a hopper 54 and the joint 48 is operatively connected to a hydraulic pump 56, of any suitable type, that is driven by a motor 58.

The lower portion of the roller 32 is received in the upper open portion of a box-like and hollow support 60 having arms 62 mounted thereon that support the jacket 14 and the conduit 10 in a substantially horizontal position. A trough 64 is suitably mounted in the support 60 and underlies the roller 32. A conveyor screw 66 is journaled for rotation in the trough 64 and is operatively connected to the motor 58 as shown in Figure 1.

A casing 68 extends from the end of the trough 64 where feed is conducted by screw 66 and to the hopper 54. A suitable elevating means 70 or endless belt supporting bucket is mounted in the casing 68 to conduct feed from the trough 64 back to the hopper 54.

A vertically disposed scraper blade 72 includes end flanges 74 that are vertically slotted to receive fasteners 76 entering the end walls of the support 60 for adjusting the blade 72 vertically to accommodate rollers of various sizes that may replace the roller 32.

A covering 78 is provided for the power means, pump means and includes a forward vertical wall 80 that terminates slightly above the roller 32. The wall 80 is formed with openings 82 for the outer ends of the nipple 12, so that only the roller, or a portion of the roller and the nipples will be exposed to frogs.

The base 22 is preferably embedded in the ground with a ramp or platform 84 carried by the support 60 resting upon the ground so that frogs may travel upon the platform to eat feed on the roller 32.

In practical use of the present invention, the pump 56 will suck feed F from the hopper 54 and force the feed into the conduit 10, through the nipples 12 and onto the roller 32. As the roller 32 is rotating and reciprocating, the feed F will assume a spiral path or undulated path on the roller and the feed will be agitated and vibrated by the movement of the roller to attract frogs thereto since the frogs will not eat the feed unless it is moving.

Any feed adhering to the roller 32 will be scraped therefrom by the blade 72 and the feed thus scraped from the roller will pass into the trough 64. The feed entering the trough 64 will be conducted to the elevating means 70 by the screw 66 where the elevating means 70 conveys the feed to the hopper 54 to be again forced into the system by the pump 56.

In order to clean the conduit 10 and the nipples 12, suitable closure caps are placed on the nipples 12 and a hose is attached to an inlet neck N depending from the pipe 46. Water or a cleaning fluid is forced through the hose and into the conduit 10. Selected or all closure caps are removed to permit the cleaning fluid to pass from the nipples.

Since in warm weather the feed, being mixed with a quantity of water, will become rather warm, the cooling means 14, 16 and 18 will tend to retain the feed relatively cool so that the frogs will enjoy the feed dispensed on the roller 32.

The pump is preferably of the intermittent type so that feed will be discharged from the nozzles 12 in phases whereby only a small amount of feed will be applied to the roller at one time.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A frog feeder comprising a dispenser having a delivery nipple, a rotating and reciprocating roller underlying said nipple, a trough underlying said roller, and means for forcing feed through the dispenser and the delivery nipple and onto the roller.

2. A frog feeder comprising an elongated horizontally disposed conduit having a plurality of radially disposed horizontally extending delivery nipples spaced longitudinally upon the conduit, a rotating and reciprocating roller paralleling the conduit and underlying the nipples, a trough paralleling and underlying the roller, means for forcing feed into the conduit and through the nipples, and scraping means underlying the roller for scraping feed from the roller whereby feed scraped from the roller will enter the trough.

3. A frog feeder comprising a dispenser having a delivery nipple, a rotating and reciprocating roller underlying said nipple, a trough underlying said roller, means for forcing feed through the dispenser and the delivery nipple and onto the roller, and means associated with the dispenser for retaining feed in the dispenser relatively cool.

4. The combination of claim 3 wherein said last named means includes a jacket enclosing said dispenser, said jacket having an opening through which said nipple projects, and a cooling medium within said jacket and about said dispenser.

5. A frog feeder comprising an elongated dispensing conduit having a plurality of longitudinally spaced nipples extending therefrom, a roller underlying said nipples, means for rotating said roller, means for imparting reciprocable motion to said roller during the rotation thereof whereby feed leaving said nipples will be disposed spirally upon the roller, and a platform leading to said roller.

6. The combination of claim 5 wherein said means for rotating said roller includes a driven shaft, said reciprocating means including a cam on said shaft, and a finger riding against said cam.

7. A frog feeder comprising an elongated delivery conduit having a plurality of horizontally disposed outlet nipples, a horizontally disposed roller underlying said nipples, means for rotating the roller, means for reciprocating said roller in response to rotation of said roller, means for forcing feed through said conduit and said nipples and onto said roller, a trough underlying said roller, means shielding said trough and including a ramp leading to said roller, means overlying said trough and underlying the roller for scraping feed from the roller whereby the feed will enter the trough, a hopper in communication with said forcing means, and means for conducting feed from said trough to said hopper.

8. The combination of claim 7 wherein said means for reciprocating said roller includes a cam rotatable with the roller, and a stationary finger riding against said cam.

9. The combination of claim 7 and means encasing said conduit for retaining feed in the conduit relatively cool.

10. The combination of claim 9 wherein said cooling means includes a cooling medium surrounding the conduit, and a jacket enclosing the conduit and holding the cooling medium.

LESLIE R. EDWARDS.

No references cited.